United States Patent
Takeshita et al.

(10) Patent No.: US 7,869,311 B2
(45) Date of Patent: Jan. 11, 2011

(54) BUILT-IN TYPE OPTICAL DISC APPARATUS

(75) Inventors: Shigehiko Takeshita, Funabashi (JP);
Mitsuo Kurokawa, Fujisawa (JP);
Masahiro Takasago, Kawasaki (JP);
Goshi Shiroishi, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 794 days.

(21) Appl. No.: 11/895,827

(22) Filed: Aug. 27, 2007

(65) Prior Publication Data

US 2008/0219107 A1 Sep. 11, 2008

(30) Foreign Application Priority Data

Mar. 8, 2007 (JP) ............................. 2007-058909

(51) Int. Cl.
*G11B 7/00* (2006.01)
*G05F 1/10* (2006.01)
(52) U.S. Cl. ............... 369/30.36; 323/234; 369/53.37
(58) Field of Classification Search ............ 369/44.11, 369/30.47, 30.59, 30.98, 189, 30.36, 53.37; 375/14–20, 232–240; 323/234–245, 300, 323/320; 307/64–66
See application file for complete search history.

(56) References Cited

FOREIGN PATENT DOCUMENTS

JP 05-307430 11/1993

*Primary Examiner*—Wayne R Young
*Assistant Examiner*—Aneeta Yodichkas
(74) *Attorney, Agent, or Firm*—Townsend and Townsend and Crew LLP

(57) ABSTRACT

An optical disc apparatus includes a first electric power source portion to convert a first power source voltage into a predetermined voltage, to be supplied to a part of the optical disc apparatus. A second electric power source, to convert a second power source voltage into another predetermined voltage, is supplied to other parts of the optical disc apparatus. An electric power source observation portion observes voltages of the first electric power source portion and the second electric power source portion so as to release resetting of a system constituting the optical disc apparatus, when the voltages of the first electric power source portion and the second electric power source portion reach respective predetermined voltages.

3 Claims, 6 Drawing Sheets

BUILT-IN TYPE OPTICAL DISC APPARATUS

BACKGROUND OF THE INVENTION

The present invention relates to an optical disc apparatus for recording information onto an optical disc or for reproducing the information recorded therefrom, and in particular, it relates to a power source portion in a built-in type optical disc apparatus to be installed inside a housing thereof, within electronic apparatuses, such as, a personal computer, etc.

Optical disc apparatuses for recording information onto an optical disc by irradiating a laser beam on a disc-like recording medium, such as, an optical disc, or for reading out the recorded information with converting the reflection light thereof into electric signals, are widely used to be information recording media within the electronic apparatuses, such as, a personal computer, etc., in particular, due to appearance of recording media of large capacity in recent years, such as, HD-DVD and/or BD, for example, and generally, in many cases, they are shipped after being built in the housing of the apparatus.

However, for example, in the following Patent Document 1 is already disclosed a supply apparatus of power source voltage, to be used for operating controller circuits, wherein not only the power supply lines of 5 V, as the operating power source voltage for the CPU, but also are included supply lines other than that, within a harness, for the purpose of enabling a stop processing operation of a CPU with certainty, even when operation power voltage for the CPU circuit falls down due to an accident of crunching wires of the harness, etc., while a resultant circuit of 5 V is provided on a controller substrate, for obtaining that operating power source voltage for the CPU and those other power source voltages. With this, it is possible to achieve a backup of 5 V with using the other power source voltages, even when the power supply lines of 5 V breaks down, and thereby executing the stop processing of the CPU.

[Patent Document 1] Japanese Patent Laying-Open No. Hei 5-307430 (1993).

By the way, as was mentioned above, within so-called a built-in type optical disc apparatus, to be installed within a housing of an electronic apparatus, such as, a personal computer, etc., includes within an inside thereof, various kinds of driving motors and/or laser diodes, and further controller circuits for those, wherein at least two (2) or more kinds of direct current (DC) power source, each differing in the supply voltages thereof, are supplied from the power supply portion provided within that electronic apparatus through a wire harness; however, when an abnormality is generated either one of those due to defects or the like when installing them into the housing of the apparatus (thus, under the condition of conducting only one-side of the power source), there can be caused cases, i.e., that the apparatus results into malfunction or causes breakdown of parts thereof. For example, in case when the power source voltage is less than a predetermined voltage (for example, 12 V), which is to be supplied to the spindle motor for rotationally driving the optical disc or a sled motor for moving an optical pickup into the radial direction of the disc, the rotation speed of the disc cannot reach to a predetermined rotation speed, even though normal power source voltage is supplied to the CPU building up the controller apparatus, or the optical pickup cannot achieve desired operation thereof (in particular, the laser diode of generating laser beam for HD-DVD and BD differs from the laser diode of generating the laser beam for DVD and CD, in the driving voltage thereof). For that reason, it is impossible to obtain operations desired to that apparatus.

However, such phenomenon (when the power source is in abnormal) is generated, in many cases, where electric power from that power source is instable, such as, an initial condition when connecting the electronic apparatus, such as, the personal computer, with a commercial power source, and further also when a delay is generated in supply of the power source, etc.

However, in the Patent Document 1 mentioned above, while observing various kinds of voltages on the supply lines of the different power sources, a backup of 5 V is conducted through other power source voltage, when detecting an abnormality of voltage, such as, short-circuit, etc.; however, no mentioning is made about the case when the abnormality is caused on the power source voltages within such the built-in type optical disc apparatus to be installed within a housing of an electronic apparatus or equipment, such as, the personal computer, etc., to which the present invention relates, as was mentioned above.

BRIEF SUMMARY OF THE INVENTION

Then, according to the present invention, accomplished by taking the problems of the conventional arts mentioned above into the consideration thereof, an object thereof is to provide a built-in type optical disc apparatus, comprising a means for protecting from a malfunction of the apparatus or breakdown of parts thereof when the abnormality is caused in a part of the power source voltages (i.e., when the power source is one-sided), in particular, in the optical disc apparatus to be installed within the housing of the electronic equipment, thereby to be supplied with plural kinds of power source voltages from a power source portion in that apparatus, and thereby achieving a desired operation of that apparatus with certainty.

For accomplishing the object mentioned above, according to the present invention, first of all, there is provided a built-in type optical disc apparatus having structures to be installed in a part of an electronic equipment having plural kinds of electric power source portions within a housing thereof, comprising, at least: a driver portion, which is configured to drive an optical disc at a predetermined rotation speed; an optical pickup, which is configured to irradiate a light beam from a semiconductor laser onto a recording surface of the optical disc, which is rotationally driven by said driver portion, so as to produce an electric signal upon receipt of a reflection light from said recording surface; a signal process or portion, which is configured to produce a desired signal upon basis of the electric signal, which is produced by said optical pickup; a feeder portion, which is configured to move said optical pickup into radial direction of said optical disc; and a controller portion, which is configured to control or drive the respective portions building up said optical disc apparatus, and further comprising: an electric power source portion, including: a first electric power source portion of said optical disc apparatus, which is configured to convert a first power source voltage, which is supplied from an electric power source portion provided within the housing of said electronic equipment, into a predetermined voltage, to be supplied to a part of the respective portions, which build up said optical disc apparatus; and a second electric power source portion of said optical disc apparatus, which is configured to convert a second power source voltage, which is supplied from another electric power source portion provided within the housing of said electronic equipment, into another predetermined voltage, to be supplied to other part of the respective portions, which build up said optical disc apparatus, wherein said electric power source portion of said optical disc apparatus further comprises an electric power source observation portion, which is configured to observe voltages of the first electric power source portion of said optical disc apparatus and the second electric power source portion of said optical disc apparatus, so as to release resetting of the controller portions and said signal processor portions, which build up said optical disc apparatus, when the voltages of said first electric power source portion and said second electric power source portion reach to predetermined voltages, respectively.

Further, according to the present invention, within the built-in type optical disc apparatus, as described in the above, it is preferable that the first electric power source portion of said optical disc apparatus converts the first power source voltage, which is supplied from the electric power source portion provided within the housing of said electronic equipment, into a plural number of predetermined voltages, to be supplied to the part of the respective portions, which build up said optical disc apparatus, and also the second electric power source portion of said optical disc apparatus converts the second power source voltage, which is supplied from the electric power source portion provided within the housing of said electronic equipment, into a plural number of predetermined voltages, to be supplied to the other part of the respective portions, which build up said optical disc apparatus, or that said electric power source observation portion of said optical disc apparatus comprises a first comparator, which is configured to compare the voltage of the first electric power source portion of said optical disc apparatus with a predetermined value, a second comparator, which is configured to compare the voltage of the second electric power source portion of said optical disc apparatus with another predetermined value, and a logical circuit, which is configured to exchange an output thereof upon basis of outputs from said first and said second comparators.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Hereinafter, embodiments according to the present invention will be fully explained by referring to the attached drawings.

Figure 1:
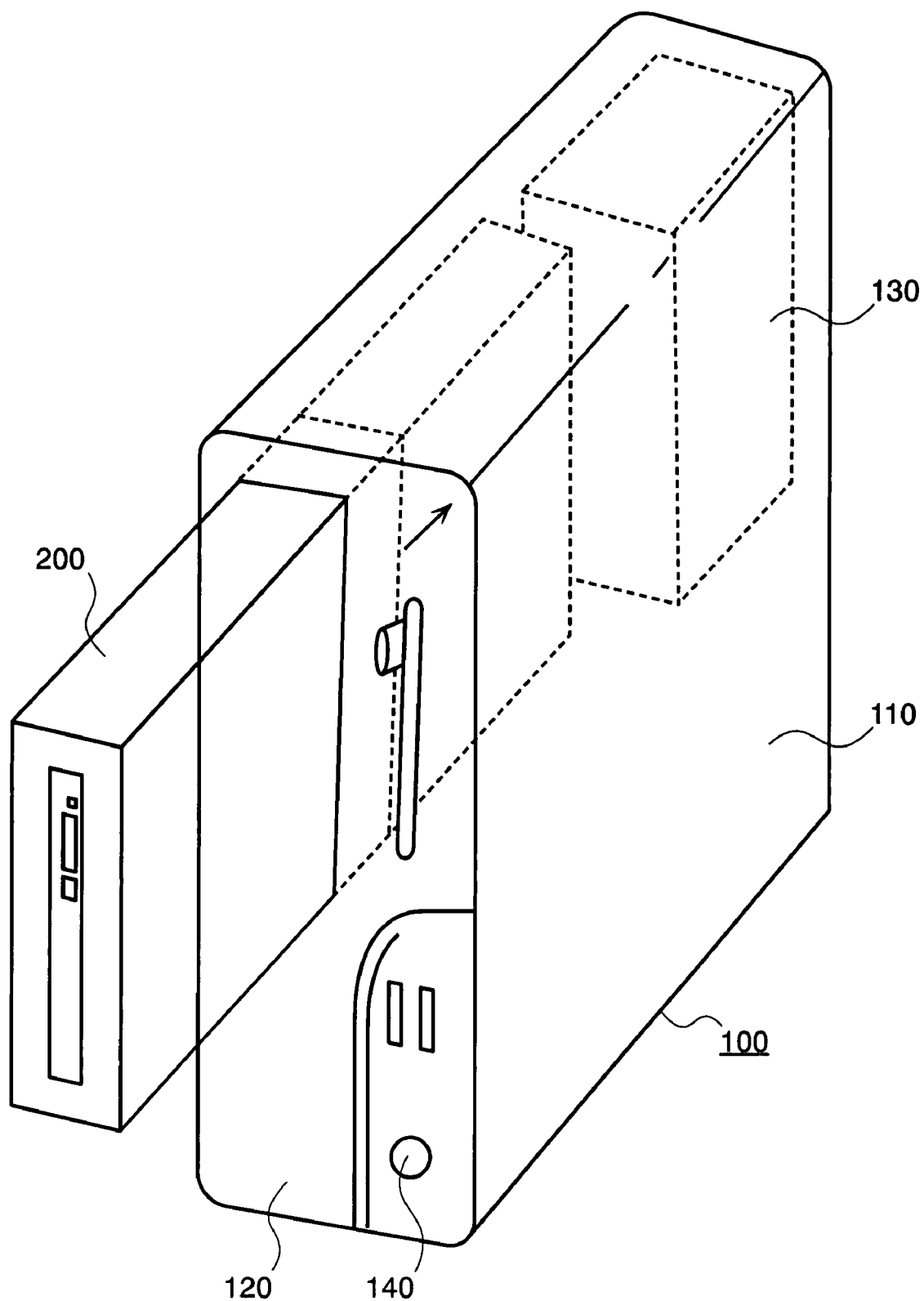
FIG. 1 is a perspective view for showing an outlook of a personal computer installing a built-in type optical disc apparatus, according to an embodiment of the present invention.

FIG. 1 attached herewith shows an outlook of an optical disc apparatus according to the present invention, i.e., a built-in type optical disc apparatus 200, to be installed within a housing 110 of an electronic apparatus or equipment, such as, a personal computer, etc., attaching a disc loading surface thereof to be exposed in a part of a front surface bezel of that apparatus. Also, in that figure, a reference numeral 130 indicates an electric power source portion, provided within a housing 110 of the electronic equipment 100 mentioned above, for supplying a plural number of DC power sources (i.e., 5 V and 12 V), and a reference numeral 140 indicates a switch (i.e., start button) for startup, being provided on a front surface portion of the electronic equipment 100.

Figure 2:
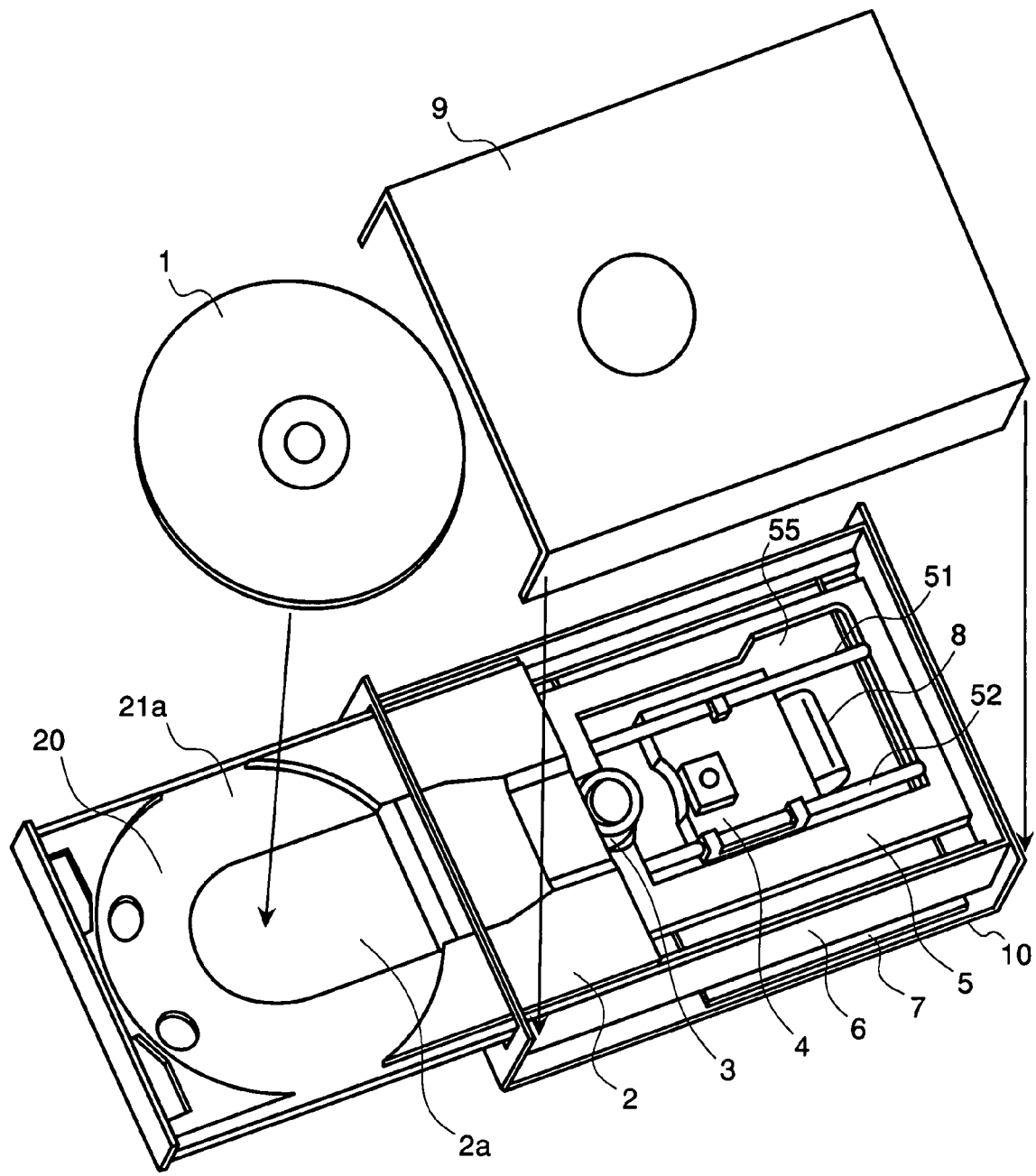
FIG. 2 is an exploded perspective view for showing an inner structure of the built-in type optical disc apparatus mentioned above.

Following to the above, FIG. 2 attached herewith is an outlook view for showing the entire structures of the built-in type optical disc apparatus 200 mentioned above, and in this figure, a reference numeral 1 depicts an optical disc, as being a disc-like recording medium for optically recording information by means of that optical disc apparatus, wherein that optical disc 1 is mounted or loaded on (i.e., a disc loading plane portion 20 of) a disc transfer member (i.e., a tray) 2, building up a part of the optical disc apparatus, to be transferred into an inside of the apparatus. Further, around at a center of this disc feed member (i.e., the tray) 2 is formed a first penetrating portion 2a, and below this is provide a disc motor 3, as a rotation device for rotationally drive the optical disc 1 mentioned above.

Also, in the figure, a reference numeral 4 depicts an optical pickup, 5 so-called a unit-mechanism chassis including the optical pickup 4 mentioned above therein, 6 so-called a unit chassis including the unit-mechanism chassis 5 mentioned above therein, and 7 a circuit board attaching various kinds of controller substrates thereon, respectively. However, as is apparent from the figure, between the optical pickup 4 and the circuit board 7 is attached a flexible cable (FFC) 8, being wide in the width thereof, for electrically connection thereof. Also, a reference numeral 9 in the figure depicts an upper cover of the housing of the optical disc apparatus and 10 a lower cover thereof.

Figure 3:
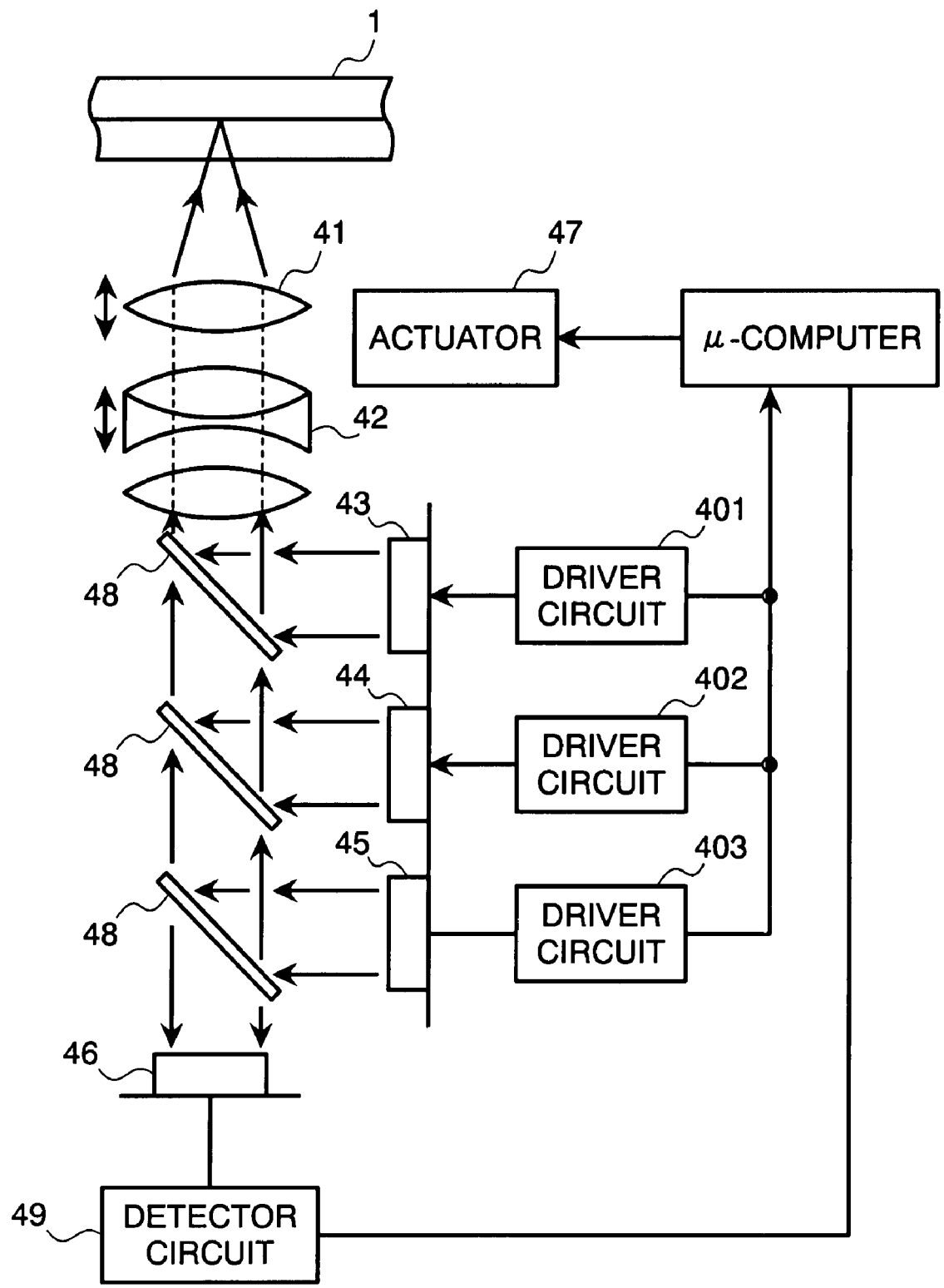
FIG. 3 is a block diagram for showing the structures, in particular, of a pickup portion of the built-in type optical disc apparatus mentioned above.

Further, as is also shown in FIG. 3 attached, the optical pickup 4 mentioned above builds therein a three (3) kinds of laser diodes (or laser light emitting elements) 43, 44 and 45, each different from one another in the wavelength thereof, and driver circuits 401, 402 and 403 for them, as well as, lenses 41 and 42 of an optical system and an actuator 47 for driving them, a detector circuit 49 made of a light receiving element, such as, a photo-transistor, etc., for receiving a reflected laser light to convert into an electric signal, a temperature detecting means not shown in the figure, and further a mechanism or the like, for exchanging those three (3) kinds of laser diodes. In more details thereof, this optical pickup 4 builds therein a laser diode for generating a laser light (wavelength: 785 nm) for CD, for conducting recording/reproducing onto/from CD, a laser diode for generating a laser light for DVD (wavelength: 660 nm), and further a laser diode for generating a blue color laser light (wavelength: 405 nm), for use of Blu-ray Disc (BD: ®) and HD=DVD (®), and thereby to enable recording/reproducing of the Blu-ray disc and HD-DVD, in addition to recording/reproducing of the conventional CD and DVD.

And, again, in FIG. 2 mentioned above, the optical pickup 4 is attached to be movable along a pair of guide shafts (or guide bars) 51 and 52 attached on the unit mechanism chassis 5, and through a moving mechanism, including a driving motor not shown in the figure herein, it is moved into the direction shown in the figure (i.e., into a radial direction of the optical disc 1 loaded into the apparatus).

Figure 4:
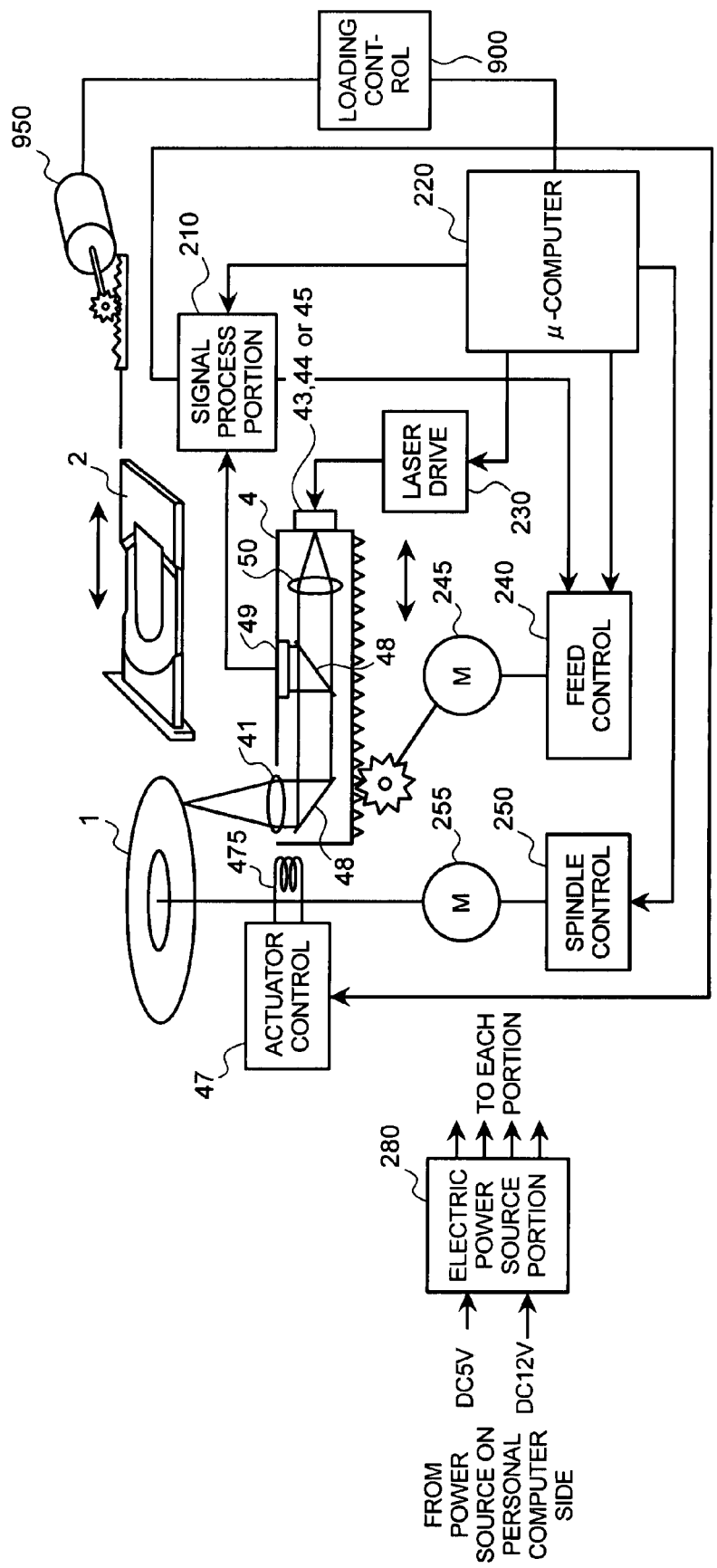
FIG. 4 is a block diagram for showing the entire structures of the built-in type optical disc apparatus mentioned above.

Next, FIG. 4 attached is a block diagram for showing the entire structures of the optical disc apparatus, according to the present invention, and in this FIG. 4, the reference numeral 4 also depicts the optical disc of high-density information recording medium. Also, the reference numeral 4 depicts the so-called pickup, and within an inside thereof are provided the semiconductor lasers 43, 44 and 45, i.e., light emission elements for generating the laser lights of desired wavelengths (the detailed structures thereof, please see FIG. 3 mentioned above), a collimate lens 50 for bringing the laser lights emitted into parallel lights, half-mirrors or mirrors 48, 48 . . . , for guiding an incident light onto a mirror, which will be mentioned later, while for guiding the reflection light onto a light receiving element, which will be mentioned later, or for changing the direction of light, an objection lens 41 for irradiating the laser lights upon the recording surface of the optical disc 1 focusing onto a predetermined beam diameter, and a light receiving element 49 to receive the reflection light from the half-mirrors 48, for detection thereof, etc.

Also, in this FIG. 4, a reference numeral 210 depicts a signal processor portion for conducting a predetermined process, through conversion of the reflection light into the electric signal upon detection thereof by means of the light receiving element 49 of that optical reproducing means, and it includes therein, for example, an analog front end (AFE) and/or a digital signal processor (DSP) and/or a PLL circuit, etc., as the contents thereof. This signal processor portion 210 is connected with a microcomputer (hereinafter, being called "μ-computer", shortly) 220, which is provided for conducting control upon the optical disc apparatus, as a whole, and it conducts various kinds of controls, including a focus control therein. Thus, this μ-computer 220 is connected with a laser driver portion 230, a feed controller portion 240, a spindle controller portion 250, an actuator control circuit 47 (the actuator shown in FIG. 3) and a loading motor controller portion 900. However, a reference numeral 475 in the figure depicts a so-called electromagnetic coil.

Thus, with such the structures as was mentioned above, the μ-computer 220 controls current to be supplied to the semiconductor lasers 43, 44 and 45, i.e., the light emitting elements of the optical pickup 4 as the optical reproducing means, so as to adjust an intensity of light emission, and it controls rotation of the motor 245 for use of control of the feed through the feed controller portion 240 mentioned above; thereby, controlling the position of the pickup 4 in the radial direction of the optical disc 1. However, in this embodiment, as a feeding mechanism into the radial direction of the optical disc 1, there is shown a gear for moving the optical pickup 4 into the radial direction through rotation of the motor 245 for use of control of the feed.

Also, the μ-computer 220 controls rotation of a motor 255 for rotationally driving a spindle, through the spindle controller portion 250 mentioned above, and thereby achieving a CLV (Constant Linear Velocity) or a ZCLV (Zoned Constant Linear Velocity), etc., being a control for a constant linear velocity, which is widely applied for such the high-density information recording medium. Further, this μ-computer 220 achieves a focus position control for the objection lens 41 of the optical pickup 4 mentioned above, for example, with using the electromagnetic coil 475, etc., as an actuating means thereof, through an electromagnetic function thereof. However, herein, the position control, which can be achieved by means of this actuator controller circuit 47, includes the position control of the objection lens 41 into the direction perpendicular to the recording surface of the optical disc 1, and in addition, further a tracking position control for following the track through a minute positional adjustment into the radial direction perpendicular thereto. In addition thereto, this μ-computer 220 conducts an insertion of a discharge of the disc feed member (i.e., the tray) 2 mentioned above, into/from the apparatus, through control of rotation of a motor 950 for use of loading through a loading controller portion 900. However, in this embodiment, as such a mechanism for moving the tray 2 mentioned above, there is shown the gear for moving the optical pickup 4 into the radial direction accompanying with rotation of the above-mentioned motor 950.

And, with the optical disc apparatus mentioned above, commands and/or data from a host (i.e., an external equipment) not shown in the figure, such as, a personal computer, etc., are decoded or read within an interface control circuit (not shown in the figure), thereby executing seek operations, such as, recording and/or reproducing of information, under the control by the μ-computer 220. Also, with signal conversion in the signal processor portion 210, it is possible to record the information onto the optical disc 1 through the optical pickup 4, and also to demodulate the various kinds of read-in signals through the light receiving element 49 into the original data via the signal processor portion 210, thereby to transfer the data demodulated to the host from the interface control circuit mentioned above, corresponding to the reproduced command. However, detailed explanations of recording/reproducing of the information are omitted herein. Also, upon the recording/reproducing of information mentioned above, various kinds of control information recorded on the optical disc 1 are produced within the signal processor portion 210, thereby to be utilized for producing control signals of various kinds of devices or apparatuses mentioned above.

And, to each of portions building up the optical disc apparatus is supplied a predetermined power source voltage among various kinds of voltages, from an electric power source portion 280, respectively. Further, this electric power source portion 280 is connected with an electric power supply portion 130 for supplying plural kinds of DC power sources (in more details, DC voltage source of 12 V and DC voltage source of 5 V), which is provided on the personal computer side, and further, it generates a large number of kinds of DC power voltages from this power source of two (2) kinds, to supply them to each of parts building up the optical disc apparatus mentioned above, and furthermore, for conducting (or instructing) stop/start of a whole system, including the μ-computer 220 of the optical disc apparatus therein.

Next, details of the electric power source portion 280 mentioned above will be explained, by referring to FIGS. 5 and 7 attached herewith.

Figure 5:
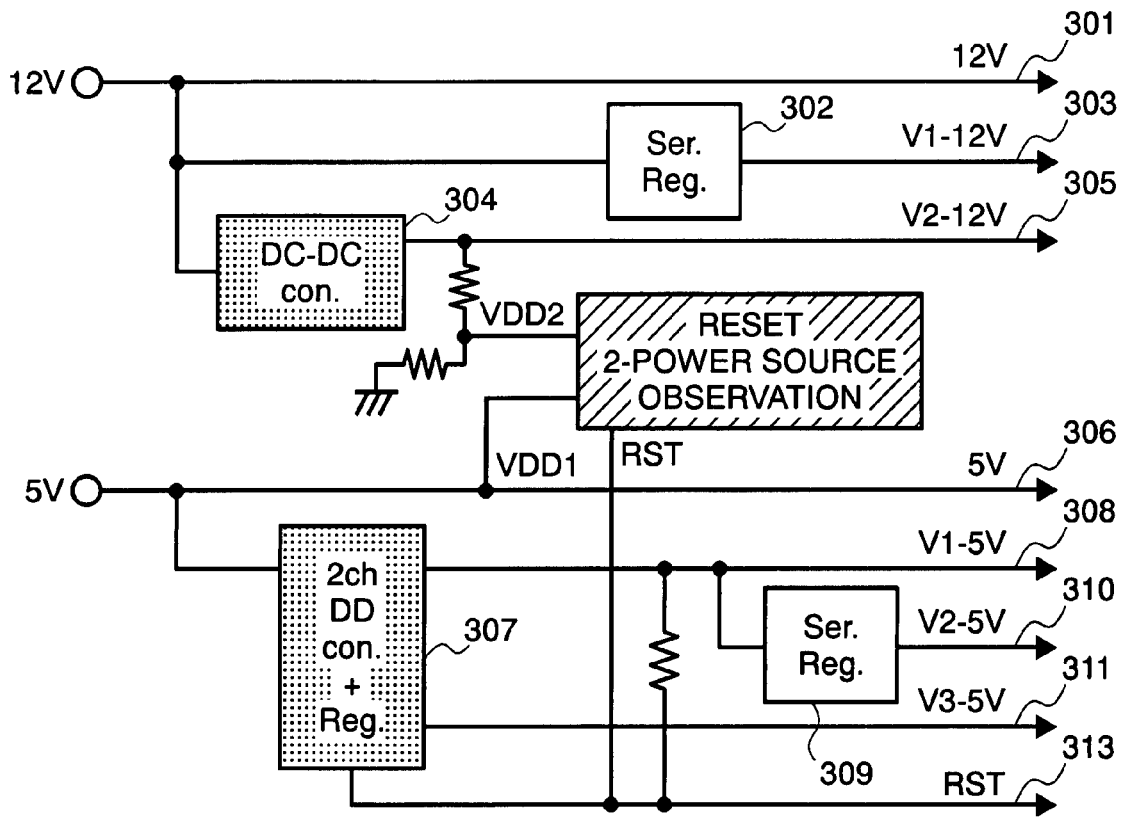
FIG. 5 is a block diagram for showing detailed structures of an electric power source within the built-in type optical disc apparatus mentioned above.

First of all, FIG. 5 attached is a circuit diagram for showing the circuit structures of the entire of the electric power source portion 280, and as is apparent from this figure, it is divide into two (2) systems, corresponding to the supply voltages from the electric power supply portion 130 on the personal computer side. Thus, a 12-V system comprises a circuit (or a line) 301 for use of 12 V, for supplying the DC voltage of 12 V, as it is, supplied from the electric power supply portion 130, a circuit (or a line) 303 for supplying that supply voltage source of 12 V as other DC voltage (V1_12V), through a series regulator 302, and further a circuit (or a line) 305, for supplying that supply power of 12 V, after conversion thereof into further other DC voltage source (V2_12V), through a DC-DC converter 304.

On the other hand, as apparent from the figure, a 5-V system comprises a circuit (or a line) 306, for supplying DQ power source of 5 V, as it is, supplied from the electric power supply portion 130 on the personal computer side, a circuit (or a line) 308, for supplying that supply power source of 5 V through a converter 307 combining two (2)-channels DC-DC converter and a regulator, as a DC power source of V1_5V, a circuit (or a line) 310, for supplying the DC power source of V1_5V from the converter 307 mentioned above, through other series regulator 309, as a DC power source of V2_5V, and further a circuit (or a line) 311 for supplying a DC power source of V3_5V from the converter 307 mentioned above.

And, further, there is provided a two-power sources observation circuit 312 for observing conditions of the two (2) systems mentioned above. However, in the present embodiment, from the 5-V system mentioned above, the two-power sources observation circuit 312 inputs DC voltage of 5 V (VDD1) as it is, from the electric power supply portion 130 provided on the personal computer side, while on the other hand, from the 12-V system mentioned above, it inputs voltage VDD2, which is obtained through dividing an output from the DC-DC converter 304 mentioned above by two (2) pieces of resistors, and thereby observing them, respectively. And, as an output thereof, it generates the reset signal (RST) for conducting (or instructing) stop/start of the whole system, including the μ-computer 220 of the optical disc apparatus, on a circuit (or a line) 313.

Further, the various kinds of DC voltages, which are generated by the electric power source portion 280 mentioned above, are supplied to each of portions building up the whole system, including the μ-computer 220 therein, as an electric power source, within the optical disc apparatus mentioned above. In more details thereof, for example, the DC voltage of 12 V is supplied to the spindle motor and the sled motor, the DC voltage of 9.5 V to the laser diode for generating the blue-color laser beam (wavelength: 405 nm) for use of Blu-ray disc and/or HD-DVD, the DC voltage of 5.7 V to the laser diode for generating the laser beam (wavelength: 785 nm) for use of CD and the laser diode for generating the laser beam (wavelength: 660 nm) for use of DVD, respectively. Also, the DC voltage of 5 V is supplied to the various kinds of actuators and the loading motor, and further to the pickup and the AFE, etc., the DC voltage of 3.3 V to the AFE and the DSP building up the signal processor portion, and further to a flash memory, etc. Further, the DC voltage of 2.8 V is supplied to the LDD-PLL, and the DC voltage of 1.5 V to a core portion of the DSP mentioned above, respectively.

Figure 6:
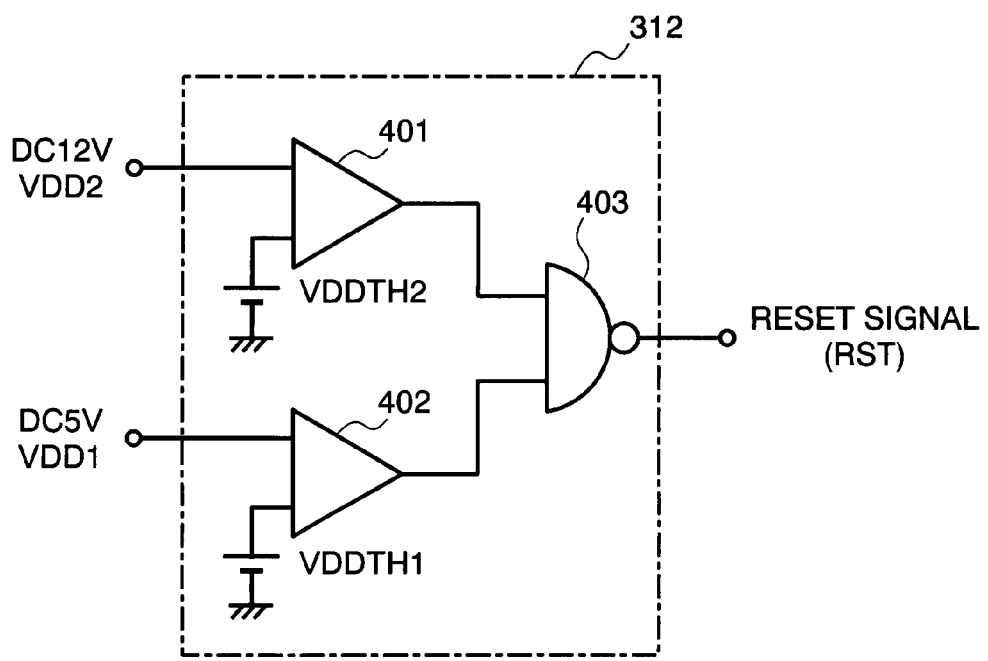
FIG. 6 is a block diagram for showing the detailed structures of a two-power sources observation circuit in the electric power source mentioned above.

Next, FIG. 6 attached herewith shows the details of, in particular, the two-power sources observation circuit 312 for observing the conditions of the two (2) systems mentioned above, building up the electric power source portion 280 mentioned above. As is apparent from the figure, this two-power sources observation circuit 312 comprises a comparator 401 for comparing the voltage VDD2 of the 12-V system of dividing the DC voltage of 12 V, with a threshold value VDDTH2, as a reference value thereof, a comparator 402 for comparing the voltage VDD1 of the 5-V system of dividing the DC voltage of 5 V, with a threshold value VDDTH1, as a reference value thereof, and a logic element (NAND) 403 for conducting an "AND" process on the outputs of those comparators, and thereby outputting a reversed output thereof. Further, an output signal of this NAND 403 conducts (or instructs) stop/start of the whole system, including the μ-computer 220 therein, as the reset signal (RST) mentioned above.

Figure 7:
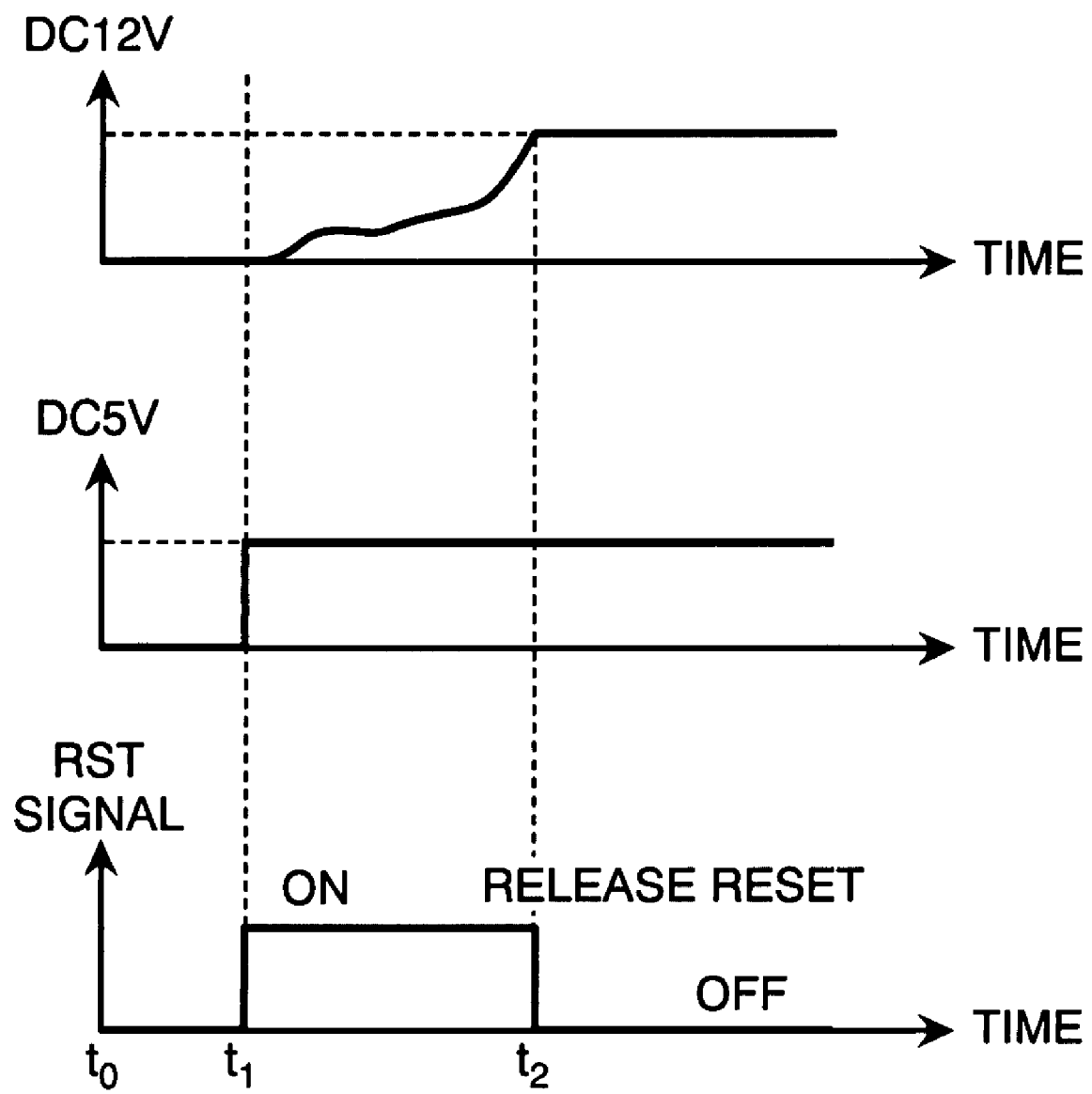
FIG. 7 shows waveforms at respective portions, for explaining the operation obtained by the two (2)-power sources observation circuit in the electric power source mentioned above.

FIG. 7 attached herewith shows signal waveforms for explaining the operation of the two-power sources observation circuit 312 mentioned above. However, herein, at a time point "$t_1$", for example, is shown the case, although the supply voltage from the power source of 5 V is in normal, but on the other hand, when the supply voltage from the power source of 5 V does not reach to the predetermined voltage, immediately, such as, due to a reason of delay or the like, for example. Thus, by means of the two-power sources-observation circuit 312 mentioned above, although the supply voltage for the power source of 5 V is in normal, and then it reaches to the predetermined value, immediately, but on the other hand, until when the supply voltage from the power source of 12 V reaches to the predetermined value (i.e., until a time point "$t_2$" when both of the voltages reach to the respective predetermined values), the NAND 403 turns the reset signal (RST) into ON condition, so that it stops the whole system, including the μ-computer 220 therein. And, at a time point (i.e., the time "$t_2$") when both of the voltages reach to the respective predetermined values, the NAND 403 releases the reset signal (RST) from the ON condition (i.e., turning it into OFF condition), and thereby starting the operation of the whole system, including the μ-computer 220 therein.

Thus, the power source portion 280 comprising the two-power sources observation circuit 312 mentioned above, in case when the supply of 5 V is in normal, but the supply 12 V is in abnormal (for example, the supply of 12 V is broken down or delayed), the two-power sources observation circuit 312 monitors the detection voltage VDD2 of the 12-V system, and with doing this, it detects the abnormality of supply of 12 V. Thus, when the VDD2 falls down to be less than the predetermined value (i.e., VDDTH2), it is determined that the power source is in abnormal, and issues the reset signal (RST); thereby, stopping the system operations, including that of the μ-computer 220. Doing this prevents the abnormal signal from being outputted to peripheral circuits, and as a result thereof, it is possible to protect the system as a whole. Further, also in case when the supply of 12 V is in normal, but the supply 5 V is in abnormal (for example, the supply of 5 V is broken down or delayed), the reset signal (RST) is issued, in the similar manner to the above, thereby it is possible to protect the system as a whole. Thus, it is possible to provide the built-in type optical disc apparatus, comprising a means for protecting from a malfunction of the apparatus or breakdown of parts thereof when the abnormality is caused in a part of the power source voltages (i.e., when the power source is one-sided), thereby achieving a desired operation of that apparatus with certainty.

As was fully mentioned in the above, according to the present invention, with the optical disc apparatus to be installed within a housing of an electronic equipment, so that plural kinds of power source voltages are supplied thereto from an electric power source portion within the electronic equipment, it is possible to protecting from a malfunction of that apparatus or breakdown of parts thereof when the abnormality is caused in a part of the power source voltages supplied from the electric power source portion provided within the electronic equipment (i.e., when the power source is one-sided), and thereby enabling to achieve a desired operation of that apparatus with certainty.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A built-in type optical disc apparatus having structures to be installed in a part of an electronic equipment having plural kinds of electric power source portions within a housing thereof, comprising, at least:

a driver portion, which is configured to drive an optical disc at a predetermined rotation speed;

an optical pickup, which is configured to irradiate a light beam from a semiconductor laser onto a recording surface of the optical disc, which is rotationally driven by said driver portion, so as to produce an electric signal upon receipt of a reflection light from said recording surface;

a signal processor portion, which is configured to produce a desired signal upon basis of the electric signal, which is produced by said optical pickup;

a feeder portion, which is configured to move said optical pickup into radial direction of said optical disc; and a controller portion, which is configured to control or drive the respective portions building up said optical disc apparatus, and further comprising:

an electric power source portion, including: a first electric power source portion of said optical disc apparatus, which is configured to convert a first power source voltage, which is supplied from an electric power source portion provided within the housing of said electronic equipment, into a predetermined voltage, to be supplied to a part of the respective portions, which build up said optical disc apparatus; and a second electric power source portion of said optical disc apparatus, which is configured to convert a second power source voltage, which is supplied from another electric power source portion provided within the housing of said electronic equipment, into another predetermined voltage, to be supplied to other part of the respective portions, which build up said optical disc apparatus, wherein said electric power source portion of said optical disc apparatus further comprises an electric power source observation portion, which is configured to observe voltages of the first electric power source portion of said optical disc apparatus and the second electric power source portion of said optical disc apparatus, so as to release resetting of the controller portions and said signal processor portions, which build up said optical disc apparatus, when the voltages of said first electric power source portion and said second electric power source portion reach to predetermined voltages, respectively.

2. The built-in type optical disc apparatus, as described in the claim 1, wherein the first electric power source portion of said optical disc apparatus converts the first power source voltage, which is supplied from the electric power source portion provided within the housing of said electronic equipment, into a plural number of predetermined voltages, to be supplied to the part of the respective portions, which build up said optical disc apparatus, and also the second electric power source portion of said optical disc apparatus converts the second power source voltage, which is supplied from the electric power source portion provided within the housing of said electronic equipment, into a plural number of predetermined voltages, to be supplied to the other part of the respective portions, which build up said optical disc apparatus.

3. The built-in type optical disc apparatus, as described in the claim 1, wherein said electric power source observation portion of said optical disc apparatus comprises a first comparator, which is configured to compare the voltage of the first electric power source portion of said optical disc apparatus with a predetermined value, a second comparator, which is configured to compare the voltage of the second electric power source portion of said optical disc apparatus with another predetermined value, and a logical circuit, which is configured to exchange an output thereof upon basis of outputs from said first and said second comparators.

* * * * *